United States Patent [19]
Murphy

[11] Patent Number: 6,131,832
[45] Date of Patent: Oct. 17, 2000

[54] MANUAL WATERING BOOM AND GREENHOUSE

[76] Inventor: John J. Murphy, 1110 Bolton Woods Rd., Sudlersville, Md. 21668

[21] Appl. No.: 09/390,641

[22] Filed: Sep. 7, 1999

[51] Int. Cl.[7] .................................................... B05B 3/00
[52] U.S. Cl. ......................... 239/726; 239/722; 239/723; 239/750; 239/754
[58] Field of Search ..................................... 239/722, 723, 239/726, 750, 754; 47/1.7

[56] References Cited

U.S. PATENT DOCUMENTS

| | | |
|---|---|---|
| 466,187 | 12/1891 | Sauer . |
| 738,271 | 9/1903 | Astle . |
| 1,178,299 | 4/1916 | Cornelius . |
| 1,191,643 | 7/1916 | Wilson et al. .................. 239/723 X |
| 1,730,248 | 10/1929 | Shaffer ................................. 239/723 |
| 2,132,314 | 10/1938 | Needler . |
| 2,293,796 | 8/1942 | Bestor . |
| 2,712,960 | 7/1955 | Grubb, Jr. . |
| 2,791,442 | 5/1957 | Lee et al. . |
| 2,915,222 | 12/1959 | Purinton . |
| 3,423,027 | 1/1969 | Small et al. ......................... 239/754 |
| 3,447,750 | 6/1969 | Weston . |
| 3,472,456 | 10/1969 | Strong . |
| 3,508,709 | 4/1970 | Small et al. ......................... 239/754 |
| 4,190,201 | 2/1980 | Geiger . |
| 4,365,748 | 12/1982 | Emrich . |
| 4,522,338 | 6/1985 | Williams . |
| 4,629,123 | 12/1986 | Gorder . |
| 4,723,709 | 2/1988 | Curran, Jr. et al. . |
| 4,809,744 | 3/1989 | Bhat . |
| 4,813,604 | 3/1989 | Curran, Jr. . |
| 5,174,507 | 12/1992 | Sapp .................................... 239/726 |
| 5,398,445 | 3/1995 | Lemons . |

*Primary Examiner*—Patrick Brinson
*Assistant Examiner*—Robin O. Evans
*Attorney, Agent, or Firm*—Nath & Associates; Gary M. Nath; Todd L. Juneau

[57] ABSTRACT

The manual watering boom comprises of a wheeled frame, a water delivery system, and a handle. The wheeled frame comprises of a horizontal beam, at least two support structures, and a wheel assembly. The horizontal beam has a first and a second end and at least two adjustable brackets are connected to it. Each support structure has a front and rear shaft, and attaches to the horizontal beam raising the horizontal beam to an elevated position. The wheel assembly attaches to each shaft and comprises of an axle and a wheel. The water delivery system comprises of a water delivery pipe and multiple irrigation outlets. The water delivery pipe is supported by the adjustable brackets and is in fluid communication with the water inlet. The multiple irrigation outlets are spaced longitudinally along the water pipe for delivering water in overlapping spray patterns. The handle comprises of a handle joint and a steering handle. The handle joint is attached to the horizontal beam. The steering handle is attached to the handle joint wherein the steering handle allows the operator to propel and direct the manual watering boom. A greenhouse employing the improved watering boom is described.

12 Claims, 2 Drawing Sheets

MANUAL WATERING BOOM AND GREENHOUSE

BACKGROUND OF THE INVENTION

1. Field of the Invention

The present inventive subject matter relates in general to irrigation devices for watering small scale commercial greenhouses, gardens, and fields. More specifically, the present inventive subject matter is directed to a watering boom having a horizontal watering pipe carried by a lightweight, four wheeled frame and is propelled and maneuvered by means of a steering arm or alternatively by means of a motor.

2. Description of the Related Art

Proper irrigation of greenhouses, gardens and fields is a time consuming task requiring a detailed knowledge of the specific vegetation being irrigated in order that the proper amount of water is applied at the proper time to meet each plant variety's needs. When irrigation takes place in a commercial setting, the knowledge required to undertake correct irrigation can therefore be quite extensive because of the numerous different plants, trees and shrubs being cultivated simultaneously. Furthermore, several knowledgeable individuals can be required to perform irrigation tasks in a small scale greenhouse, field or nursery, in order that all the vegetation be properly irrigated on a regular basis. However, it is not always practicable to hire numerous, knowledgeable people due to the economic constraints of managing a small greenhouse or farming operation.

Numerous irrigation devices are found in the art. For example, Sauer, U.S. Pat. No. 466,187, discloses a watering apparatus comprised of a wheeled frame, and an axially-rotatable watering distributing pipe having a series of water-distributing cups. Water is conducted to the device from an external water source via a rolled hose. The device is designed to be propelled by one person using a system consisting of a lever, chain, fulcrum and leg.

Astle, U.S. Pat. No. 738,271, discloses an irrigation apparatus designed for irrigating large areas comprised of independent trucks formed with telescoping members, carrying wheels mounted on the members, a spray-pipe and a means of securing the spray-pipe to the truck. The independent trucks are of adjustable height, so that the spray pipe can be manipulated in relation to the size of the crops to be irrigated.

Shaffer, U.S. Pat. No. 1,730,248, discloses a lawn sprinkler constructed of a horizontally disposed pipe mounted for a turning movement about its longitudinal axis, having spaced apart lateral irrigating openings and wheels to provide carriage.

Needler, U.S. Pat. No. 2,132,314, discloses a lawn sprinkler comprised of a wheeled carriage, a water motor, spray jets and rocking castings whereby the area to be sprayed is variable.

Lee et al., U.S. Pat. No. 2,791,442, disclose a transport for mobile irrigation apparatus which is comprised of an elongated drawbar, and to which at least three wheeled frames are adjustably secured.

Platt, U.S. Pat. No. 3,807,635, discloses a lawn sprinkling device designed to provide an accurate sprinkling pattern with ease of mobility and adjustability. The device is comprised of an elongated hollow pipe having a series of spaced apart outlets disposed along a portion of the circumference. The pipe is supported by wheeled brackets.

Williams, U.S. Pat. No. 4,522,338, discloses a self-propelled irrigation system that is fully automated and is comprised of a water delivery pipe, which is movably supported by a cart means. Rotatable sprinkler guns are longitudinally spaced along the water delivery pipe to deliver an overlapping spray pattern.

Gorder, U.S. Pat. No. 4,629,123, discloses a crop sprayer for the spraying of standing crops which is comprised of a main frame, at least one horizontal boom designed to minimize damage to crops, multiple spray nozzles attached to the boom and a liquid storage tank.

The irrigation means discussed above are deficient in many aspects. First, none is specifically designed to efficiently irrigate a the area of greenhouse, garden or field. Second, none is designed to minimize the labor and attendant knowledge required to adequately irrigate a constituent of varied vegetation with respectively varying irrigation requirements. Third, none is specifically designed to be lightweight and maneuverable in the restricted space of a greenhouse, small garden or field. Finally, none is specifically designed to apply the correct amount of water for the appropriate duration of time to a variety of plants with little or no adjustment to the irrigation apparatus, and thereby decreasing the required skill level of the person irrigating.

Thus, there remains a need in the art for a lightweight, adjustable manual watering boom for small to medium sized commercial gardens, farms, and greenhouses which saves both time and money by decreasing the intensive labor costs associated with irrigation. Furthermore, it is desirable to decrease the required skill level of the persons irrigating, so that the success of the vegetation is not dependant on the availability of knowledgeable and/or skilled labor. Finally, it is extremely desirable to obtain, by proper application of water, the high quality of the plant products is equivalent with and/or competitive with the hand watering practiced in the small grower industry.

BRIEF SUMMARY OF THE INVENTION

Therefore, the present inventive subject matter has been made in view of the above problems, and it is the object of the present inventive subject matter to provide for a lightweight, manual watering boom, which reduces the necessity of extensive and costly labor, while providing proper and thorough irrigation.

Accordingly, the present invention provides a manual watering boom intended for watering vegetation in a greenhouse, garden, and fields comprising: a frame, a water delivery system, and handle. The frame comprises: a horizontal beam with adjustable brackets at either end and a right wheel assembly and left wheel assembly, each being substantially identical to each other. Each wheel assembly comprises: a front fork and front wheel and a rear fork and rear wheel. The water delivery system comprises: an adjustably mounted water pipe with a right capped end fitted with a hose nipple, a left capped end fitted with a hose nipple, and a plurality of irrigation outlets.

The manual watering boom is intended for watering vegetation and the like, without limitation, in small scale commercial greenhouses, gardens, and fields. The manual watering boom comprises: a lightweight frame. The light weight frame comprises: a transverse, horizontal beam carrying a pair of adjustable brackets, first, second and third handle joint sockets, a removable and movable steering arm bracket fitted into said first or third handle joint socket, and having a right and left end. The light weight frame is supported by a vertically mounted right truck assembly carried by the right end of said horizontal beam. The horizontal beam comprises: a right front vertical shaft. The right truck assembly comprises: a right front bracket carried by said right front vertical shaft and said horizontal beam, and a right front wheel assembly carried by said right front vertical shaft. The right front wheel assembly comprises: a right front fork, a right front axle carried by said right front fork, and a right front rotatably mounted wheel carried by said right front axle. The light weight frame comprises a rear vertical shaft. The rear vertical shaft comprises: a right rear wheel assembly. The right rear wheel assembly comprises: a right rear fork, a right rear axle carried by said right rear fork, and a right rear rotatably mounted wheel carried by said right rear axle. The right rear rotatably mounted wheel is of a larger diameter than said right front rotatably mounted wheel. The light weight frame is supported by a vertically mounted left truck assembly carried by the left end of the horizontal beam. The left truck assembly comprises: a left front vertical shaft and a left rear vertical shaft. The left front vertical shaft comprises: a left front bracket carried by said left front vertical shaft and said horizontal beam, and a left front wheel assembly carried by said left front vertical shaft. The left front wheel assembly comprises: a left front fork, a left front axle carried by said left front fork, and a left front rotatably mounted wheel carried by said left front axle. The left rear vertical shaft comprises: a left rear wheel assembly carried by said left rear vertical shaft. The left rear wheel assembly comprises: a left rear fork, a left rear axle carried by said left rear fork, and a left rear rotatably mounted wheel carried by said left rear axle. The right rear rotatably mounted wheel is of a larger diameter than said right front rotatably mounted wheel.

The water delivery system comprises: a vertically, slidably mounted U-shaped water pipe having a capped right end fitted with a hose nipple projecting in the direction of the rear, a capped left end fitted with a hose nipple projecting forward, and a horizontal bottom section. The horizontal bottom section is fitted with a plurality of regularly spaced irrigation outlets. The U-shaped water pipe is carried by the horizontal beam and affixed thereto by the pair of adjustable brackets.

The steering handle is affixed to and carried by the second handle joint socket and radiates rearwardly and transversely. The steering arm can be removed and affixed to and carried by the second adjacent handle joint socket so that it is radiating forwardly.

A manual watering boom which is intended for watering vegetation in a greenhouse, garden, and fields, comprises: the frame, the water delivery system, and the handle. The frame comprises: the horizontal beam with adjustable brackets at either end and a right wheel assembly and left wheel assembly, each being substantially identical to each other. Each wheel assembly comprises: a front fork and front wheel and a rear fork and rear wheel. The water delivery system comprises an adjustably mounted water pipe. The adjustably mounted water pipe comprises: a right capped end fitted with a hose nipple, a left capped end fitted with a hose nipple, and a plurality of irrigation outlets. The handle comprises: a handle joint attached to the horizontal beam wherein the moveable and removable steering handle is attached.

BRIEF DESCRIPTION OF THE DRAWINGS

FIG. 1 shows the novel watering boom having a lightweight, adjustable frame which provides efficient water application for small to medium sized commercial gardens, farms, and greenhouses saves both time and money by decreasing the intensive labor costs associated with the hand watering heretofore required in the industry.

DETAILED DESCRIPTION OF THE INVENTION

The present invention provides a lightweight, adjustable manual watering boom for small to medium sized commercial gardens, farms, and greenhouses which saves both time and money by decreasing the intensive labor costs associated with irrigation. The present invention provides the ability to decrease the required skill level of the persons irrigating, so that the success of the vegetation is not dependant on the availability of knowledgeable and/or skilled labor. Therefore high quality plant products are obtained which are competitive with the hand watering obtained in the small grower industry.

Figure 1:
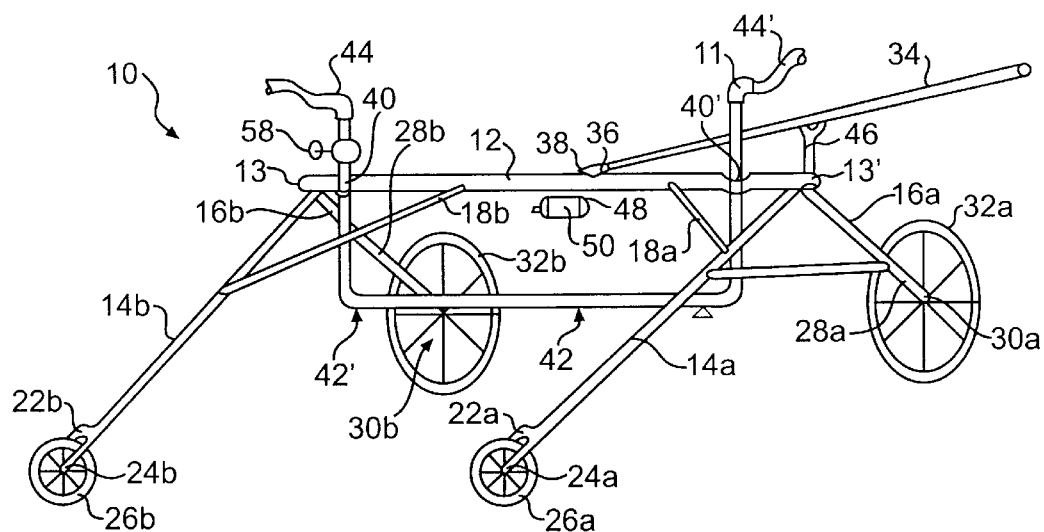
FIG. 1 is a drawing showing a perspective view of a preferred embodiment of the watering boom.
Figure 2:
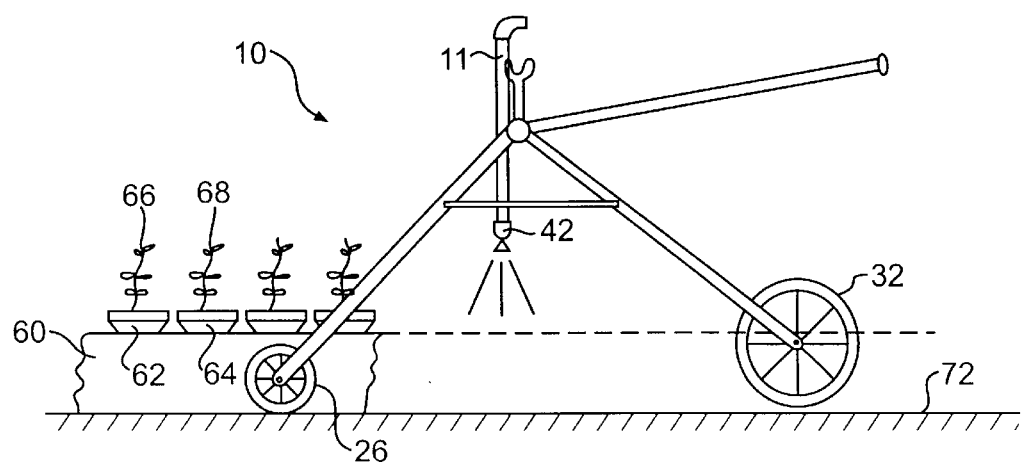
FIG. 2 is a drawing showing a right side view of a preferred embodiment of the watering boom.
Figure 3:
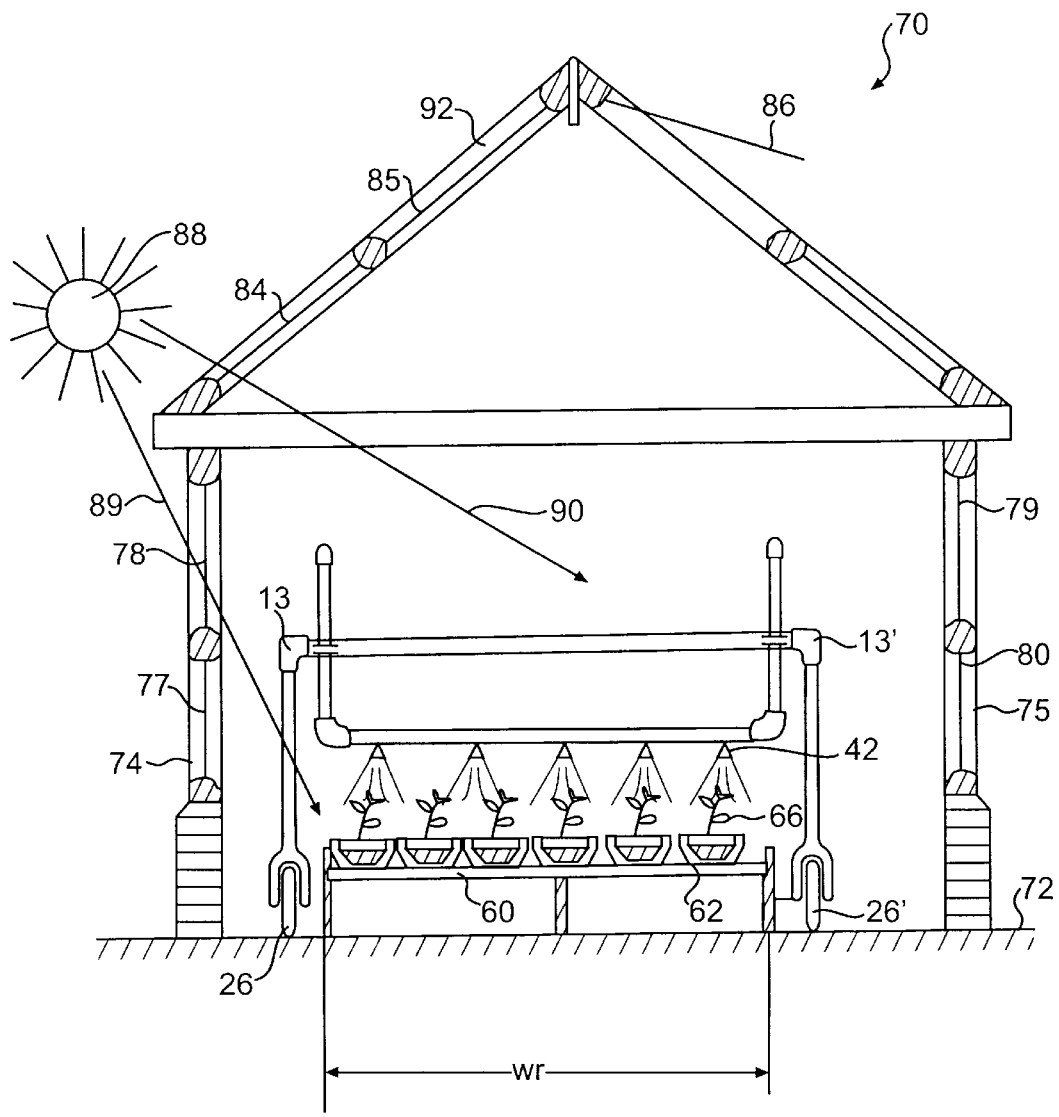
FIG. 3 is a drawing showing a front view of a preferred embodiment of the watering boom in a green house of the present invention.

Referring now to FIGS. 1 through 3 in detail, there is shown a manual watering boom 10 which can be made with various sorts of plastic and/or metal piping. The manual watering boom 10 is preferably made from common one inch polyvinyl chloride tubing and galvanized piping. Alternative embodiments can include water piping made from copper, aluminum, and other equivalent materials.

The manual watering boom 10 of the instant invention is comprised generally of a watering pipe 11 and horizontal beam 12, which are supported by a pair of front and rear shafts 14, 16. The front and rear shafts 14, 16 extend from the left and right sides of the horizontal beam 12. Preferably, these elements are made from galvanized piping and are attached to the horizontal beam 12 by welding.

The length of the water pipe 11 is dependent upon the size of the manual watering boom 10. The watering pipe 11 consists of three pieces of strong light weight piping, preferably polyvinyl chloride. The longest piece of piping spans parallel to the ground and has an elbow joint at each end. Polyvinyl chloride piping is attached to the elbow joints and spans upwardly, perpendicular to the ground. In a preferred embodiment, the boom of the present invention has a plurality of water inlets 44, 44'. In a most preferred embodiment it has two water inlets 44, 44', one at each end of the water pipe 11. The water inlets 44 are attached to each end of the water pipe 11 preferably by threading the piping and attaching the water inlets 44, 44'. The water inlets are made of a light weight material, preferably polyvinyl chloride piping. The water inlets 44, 44' comprise of a manual water control valve 58 enabling the operator to control water flow to the manual watering boom 10.

The horizontal beam 12 is constructed of strong yet light weight materials. Preferably, the horizontal beam 12 is made from galvanized piping or other suitable equivalent materials. The horizontal beam 12 has two ends that are fitted into an angled sleeve to connect right 14a, 16a and left shafts 14b, 16b. The horizontal beam 12 is connected to the watering pipe 11 by means of adjustable brackets 40, 40'. The adjustable brackets 40, 40' are bolted to the horizontal beam 12 and enable the watering pipe 11 to be set at varying heights.

The right front shaft 14a and the left front shaft 14b extend forwardly from the horizontal beam 12. The right rear shaft 16a and the left rear shaft 16b extend backwardly from the horizontal beam 12. The horizontal beam 12 is mounted upon the front 14 and rear 16 shafts and preferably attached by welding.

The front and rear shafts 14, 16 are joined at each end of the horizontal beam 12 by the angled sleeve 13. The angled sleeves 13, 13' are made of strong light weight material, preferably metal, aluminum, or plastic.

The right front fork 22a and left front fork 22b are made preferably of galvanized piping. Preferably the right front fork 22a and the right front shaft 14a are an inseparable part. Preferably the left front fork 22b and the left front shaft 14b are an inseparable part. This can be accomplished by means of stamping or forging. Alternatively, the front shafts 14 and the front forks 22 can be produced separately and attached. The right front fork 22a houses the right front axle 24a. The left front fork 22b houses the left front axle 24b.

The front wheel 26 is rotably mounted to the front axle 24. The front axles 24 and rear axles 30 are constructed of strong light weight material preferably metal or aluminum.

The front right wheel 26a and front left wheel 26b are standard wheels, preferably miniature bicycle wheels. The front wheels 26 are comprised of a tire 52a, tire tube 54a, and rim 56a. Alternative embodiments can include train-like wheel which would enable the apparatus to move along a track (not shown).

The right rear wheel 32a and the left rear wheel 32b are standard wheels, preferably regular sized bicycle wheels. The rear wheels 32 are comprised of a tire 52b, tire tube 54b, and rim 56c. Alternative embodiments can include a train like-wheel which would operate along a track (not shown). The right rear wheel 32a is rotably mounted to the right rear axle 30a. The left rear wheel 32b is rotably mounted to the left rear axle 30b. The rear axles 30 are made of strong light weight material, preferably metal or aluminum.

The right rear fork 28a houses the right rear axle 30a. The left rear fork 28b houses the left rear axle 30b. Preferably, the rear fork 28 and the rear shaft 16 are a single inseparable part. This part can be manufactured by stamping or forging. Alternatively, the rear shaft 16 and rear fork 28 can be produced separately and attached. The right rear shaft 16a and left rear shaft 16b are attached to the horizontal beam preferably by welding.

The steering handle 34 extends backwardly away from the horizontal beam 12. The steering handle 34 allows the operator to manually propel and direct the manual watering boom 10 from the rear. The steering handle is made of strong light weight material, preferably galvanized pipe, that can withstand the exertion of force. Alternative embodiments can include aluminum or other strong, light weight materials. The steering handle 34 is connected to the horizontal beam 12 by the handle joint 36 which enables a free range of motion for the steering handle 34. The handle joint 36 can be any type of joint which offers either a hinge or swivel action. The handle joint 36 can be constructed of a strong light weight material.

While not being used, the steering handle 34 can be placed on the handle bracket 38. The handle bracket 38 is a two-pronged fork like structure made of a light weight material which can support the steering handle 34. The handle bracket 38 is mounted on the left side of the horizontal beam 12.

The spray nozzles such as the nozzles 42, 42' are made of strong light weight material preferably plastic. Each spray nozzle 42 can be individually valved by a manually operated on-off valve (not shown). The spray nozzles 42, 42' are mounted on the water pipe 11. The spray nozzles 42 are distanced accordingly for effective coverage of the area to be irrigated.

The water hose support 46 is made of a strong light weight material, preferably plastic and is mounted on the horizontal beam 12. The water hose support 46 alleviates strain from the water inlet 44 while the manual watering boom 10 is connected to a water source.

An optional motor support 48 is attached to the horizontal beam 12. The motor support 48 is made of strong light weight materials such as metal or steel. If the operator wishes for an automated watering boom, an optional motor 50 can be mounted on the motor support 48. The motor 50 can be used to drive the boom 10 by a system of chains (not shown) or drive shafts (not shown).

Referring now to FIG. 2 there is shown the manner in which the boom 10 of the present invention is used. The boom 10 has the wheels 26, 32 positioned on either side of a rack 60 containing a plurality of pots such as the pots 62, 64. Within each pot such as the pots 62, 64 are plants such as the plants 66, 68. Water sprays form the nozzles 42 and efficiently waters all plants.

Referring now to FIG. 3 there is shown an improved green house 70 of the present invention. The green house 70 comprises a horizontal base 72. Walls 74, 75 are carried by the base 72. The walls 74, 75 contain glazing 77, 78, 79, 80 which renders the walls 74, 75, light transmissive. A light transmissive roof 82 is carried by the walls 74, 75. The roof 82 has glazing such as the glazing 84, 85 thus rendering the roof 82 light transmissive. The roof 82 can have a vent 86. Sunlight from the sun 88 passes through the wall 74 as represented by the ray 89. Similarly light passes through the roof 82 as represented by the ray 90. The glazing can be of any light-transmissive material such as glass, or any transparent thermoplastic material such as polyethylene, poly (methylmethacryalte) or polycarbonate. The material can be in the form of self supporting sheets or flexible foil.

Within the green house 70 are a number of plant racks such as the plant rack 60. The plant rack 60 is carried by the base 72. The plant rack 60 has a given width "wr" which is less that the width "wb" of the boom 10 measured between the inside of the wheels 26a, 26b. In this manner the boom 10 can be easily rolled over the plants to be watered.

In a particularly advantageous embodiment of the present invention the boom 10 is utilized inside or outside a green house.

Although the invention has been described in detail with respect to a preferred embodiment thereof, it will be understood that modifications can be made without departing from the invention as described above and claimed below.

What is claimed is:

1. A watering boom for watering vegetation on plant racks in a greenhouse said boom comprising:

a wheeled frame of greater width than said racks comprising:

a horizontal beam having a first end and a second end;

at least two adjustable brackets which are connected to the horizontal beam;

at least two support structures attached to the horizontal beam, each support structure having a front shaft and a rear shaft wherein each support structure raises the horizontal beam to an elevated position;

a wheel assembly attached to each shaft, each wheel assembly comprising:

a fork;

an axle journaled in the fork; and a wheel rotably mounted on the axle;

a water delivery system comprising:

a water delivery pipe that is supported by the adjustable brackets;

multiple irrigation outlets spaced longitudinally along the water delivery pipe for delivering water in overlapping spray patterns;

at least one water inlet in fluid communication with the water delivery pipe, wherein the water inlet is connectable to a water supply;

a first handle comprising: a first handle joint attached to the horizontal beam;

a steering handle attached to the first handle joint, wherein the steering handle allows an operator to manually propel and direct the manual watering boom.

2. The boom of claim 1 which has a plurality of water inlets.

3. The boom of claim 1 wherein the wheeled frame has a motor support attached to the horizontal beam and wherein a fork-like water hose support is attached to the horizontal beam.

4. The boom of claim 1 wherein the wheeled frame is composed of galvanized piping, aluminum, plastic, or combinations thereof.

5. The boom of claim 1 wherein the water delivery system has a water delivery pipe is made of 1 inch polyvinyl chloride piping, copper piping, aluminum piping or combinations thereof; and wherein the irrigation outlets include spray nozzles.

6. The boom of claim 1, wherein the handle is composed of polyvinyl chloride piping, aluminum piping, or combinations thereof.

7. The boom of claim 1 wherein the front wheel is a miniature bicycle wheel and wherein the rear wheel is a standard bicycle wheel.

8. The boom of claim 1 wherein the handle is extendable and retractable enabling the handle to vary in lengths as desired.

9. The boom of claim 7 wherein the wheels can be received by a track.

10. The boom of claim 5 wherein the water delivery pipe is "U" shaped.

11. The boom of claim 5 wherein the spray nozzles comprise of plastic, aluminum, metal, and derivatives and combinations thereof.

12. An improved greenhouse comprising:

a horizontal base;

light transmissive walls carried by said horizontal base;

a light transmissive roof carried by said light transmissive walls;

a plurality of plant racks of a given width carried by said horizontal base;

plants carried by said plant racks;

a manual watering boom for watering vegetation within the greenhouse said boom comprising:

a wheeled frame of greater width than said racks comprising:

a horizontal beam having a first end and a second end;

at least two adjustable brackets which are connected to the horizontal beam;

at least two support structures attached to the horizontal beam, each support structure having a front shaft and a rear shaft wherein each support structure raises the horizontal beam to an elevated position;

a wheel assembly attached to each shaft, each wheel assembly comprising: a fork, an axle journaled in the fork; and a wheel rotably mounted on the axle;

a water delivery system comprising:

a water delivery pipe that is supported by the adjustable brackets;

multiple irrigation outlets spaced longitudinally along the water delivery pipe for delivering water in overlapping spray patterns;

at least one water inlet in fluid communication with the water delivery pipe, wherein the water inlet is connectable to a water supply;

a handle comprising:

a handle joint attached to the horizontal beam;

a steering handle attached to the handle joint, wherein the steering handle allows an operator to manually propel and direct the manual watering boom.

* * * * *